(12) United States Patent
Johnson (10) Patent No.: US 8,108,499 B2
(45) Date of Patent: Jan. 31, 2012

(54) NAME REGISTRAR SYSTEM AND METHOD

(75) Inventor: Paul A. Johnson, Plano, TX (US)

(73) Assignee: Alcatel Societe Anonyme, Paris (FR)

( * ) Notice: Subject to any disclaimer, the term of this patent is extended or adjusted under 35 U.S.C. 154(b) by 332 days.

(21) Appl. No.: 09/952,856

(22) Filed: Sep. 12, 2001

(65) Prior Publication Data

US 2003/0051067 A1    Mar. 13, 2003

(51) Int. Cl.
*G06F 15/173*    (2006.01)
(52) U.S. Cl. .......................... 709/223; 709/220; 709/250
(58) Field of Classification Search .................. 709/318, 709/223, 227, 220, 250
See application file for complete search history.

(56) References Cited

U.S. PATENT DOCUMENTS

| | | | |
|---|---|---|---|
| 5,842,219 A | | 11/1998 | High, Jr., et al. |
| 6,154,738 A | * | 11/2000 | Call .................. 707/4 |
| 6,453,356 B1 | * | 9/2002 | Sheard et al. ................. 709/231 |
| 6,457,170 B1 | * | 9/2002 | Boehm et al. ................. 717/106 |
| 6,895,431 B1 | * | 5/2005 | Bero ............................ 709/220 |
| 7,185,079 B1 | * | 2/2007 | Bainbridge et al. .......... 709/223 |
| 2002/0010795 A1 | * | 1/2002 | Brown ......................... 709/245 |
| 2002/0013882 A1 | * | 1/2002 | Ko et al. ...................... 711/111 |
| 2002/0059241 A1 | * | 5/2002 | Van Ryzin .................... 707/10 |
| 2002/0188757 A1 | * | 12/2002 | Yoon et al. ................... 709/245 |
| 2003/0009592 A1 | * | 1/2003 | Stahura ........................ 709/245 |
| 2003/0074580 A1 | * | 4/2003 | Knouse et al. ............... 713/201 |
| 2003/0110021 A1 | * | 6/2003 | Atkin ............................ 704/1 |
| 2003/0154279 A1 | * | 8/2003 | Aziz ............................. 709/225 |
| 2009/0106277 A1 | * | 4/2009 | Sidman ........................ 707/100 |

FOREIGN PATENT DOCUMENTS

| | | |
|---|---|---|
| EP | 0 733 968 A | 9/1996 |
| WO | WO 99/28819 A | 6/1999 |

OTHER PUBLICATIONS

OMG, "Naming Service Specification," Feb. 2001, XP-002341534.*
1998 Object Management Group (OMG) PDF document "The Common Object Request Broker: Architecture and Specification" at ftp://ftp.omg.org/pub/docs/formal/98-12-01.pdf [714 pgs].
1998 Object Management Group (OMG) CORBAservices: Common Object Services Specification, Revised Edition, OMG TC Document Dec. 9, 1998, Object Management Group (ftp://ftp.omg.org/pub/docs/formal/98-12-09.pdf) [1177pgs].
Object Management Group: "CORBAservices-Naming Service Specification"; Feb. 2001; pp. 1-5; Retrieved from the Internet: URL: ftp://ftp.omg.org/pub/docs/formal/01-02-65.pdf> retrieved on Aug. 19, 2005!

* cited by examiner

*Primary Examiner* — John Follansbee
*Assistant Examiner* — Nghi V Tran
(74) *Attorney, Agent, or Firm* — Garlick Harrison & Markison; Jessica W. Smith (57) ABSTRACT

A Name Registrar (NaR) system and method incorporating a separate software component that permits manipulation, control, and distribution of names/objects under direction of a distributed naming policy is disclosed. The present invention teaches creation of a separate software component to handle name registration running within a separate software process. This separate software process has a remote interface utilized by a software application to send information related to names/objects in their most basic form to the Name Registrar (NaR). Subsequently, the NaR performs all other functions that are necessary to publish the supplied name/object in the proper form and type required by the accessing system consumers.

13 Claims, 12 Drawing Sheets

NAME REGISTRAR SYSTEM AND METHOD

CROSS REFERENCE TO RELATED APPLICATIONS

Not Applicable

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention is related to the general area of any distributed computing software application that makes extensive use of names to find objects representing services but may have specific application in network and distributed Element Management Systems (EMS). These related software techniques may be used to minimize the maintenance overhead of EMS when responding to changes in network protocols and/or incorporation of new/modified network elements (NE). While the present invention has wide applicability to distributed name and object distribution systems, one particularly advantageous application is in the area of distributed telecommunications network management systems.

BACKGROUND AND DESCRIPTION OF THE PRIOR ART

Overview

The essence of distributed computing software applications is that there are a number of components, each of which provides one or more specialized services, which are distributed in time and/or space. In order for the application as a whole to work, the different components must be able to access each other's services. To accomplish this, the components must know how to find the available services by some means. In distributed object-oriented software, the means to find the services (which are represented by different object interfaces) is to look them up by name from some central location. This name lookup is similar to what people do when they want to find a service, such as a plumber. They go to a phone book (a central location), look up a name according to a set of rules (in this case, alphabetical listings of company names by category of service) and find the location (phone number) from which the service can be accessed.

The finding of object interfaces by looking up a name can become very complicated. What the name means, how it is constructed, what parts does it have and where the names are located are all part of a set of rules. This set of rules can be called a naming policy. The naming policy must be followed by all components of the distributed application for any component to work properly. The components publishing names must follow the naming policy so that other components, again using the naming policy, can later find the objects by name.

To ensure that all components follow the policy, a common approach is to embed the policy in the code or configuration of each and every application component. Unfortunately, this strategy of embedding the naming policy, and perhaps more than one in more complicated applications, in every component means that any change in the policy requires every component to be modified. Coordinating this modification across many components and versions of complex, distributed software is usually a costly and mistake-prone endeavor. Modifying software is a form of software maintenance. In this case, modifications to support naming policy changes are very costly because every component needs to be modified.

The technical problem is to reduce the maintenance costs of changing naming policies in a distributed software product.

Prior Art Solutions

The existing prior-art solutions can be organized into three categories: avoidance, design minimization, and automation.

Avoidance of maintenance is achieved by making all possible naming policies static and fixed. No subsequent changes are allowed, thus there is no associated maintenance costs.

Design minimization is achieved by making the initial naming policy as simple as possible. An example of a simple naming policy is a common 'white pages' phone book. Every name is listed at the 'top' level following an alphabetical structure. No hierarchical structure is allowed. This is known as a 'flat' structure and it has some very restrictive constraints such as every name must be unique in the entire phone book. Maintenance costs are limited because a simple naming policy can only be modified in very limited ways. In the phone book example, new names can be added, old names can be removed and the number for a name can be changed. Otherwise, nothing can be done without breaking the simple policy.

Automation of any naming policy changes is another way to reduce maintenance costs. By creating automatic tools that can modify the code and/or configuration of components for naming policy changes, the maintenance effort can be reduced. However, this doesn't change the fundamental fact that all components must be modified to support any naming policy changes.

Deficiencies in the Prior Art

The existing solutions either lack flexibility or are not cost efficient.

Both the avoidance and design minimization approaches limit what the naming policy can be or do. As software is used and extended, new requirements for the naming policy cannot be accommodated. Avoidance means that no changes are tolerated. Minimization means that only a very small set of changes can be made. Anything more significant and the minimal design is broken.

The automation approach is usually not cost efficient. The cost of making and maintaining the automation tools must be amortized over many changes of naming policy across many components. Otherwise, the build and maintenance costs of the tools may exceed the cost of simply changing each component manually. Also, the automation tools are usually created with specific constraints on the possible changes in naming policy. Significant naming policy changes require significant changes to the automation tools, compromising the cost savings of automation.

Finally, none of the existing solutions can easily support the most common change of all; where new software clients expect new, additional naming policies for existing distributed computing software components. This type of change leaves an existing naming policy untouched, but adds one or more new sets of rules. The avoidance and minimization approaches cannot handle this change at all. The automation approach incurs substantial additional costs to support this, if it is even feasible at all.

OBJECTIVES OF THE INVENTION

Accordingly, the objectives of the present invention are (among others) to circumvent the deficiencies in the prior art and affect the following:
(1) To reduce software maintenance overhead associated with maintaining naming policies.
(2) To reduce the coupling between naming policies and components in a distributed computing software application
(3) To permit updates of naming policies without requiring software system restarts and/or application system interruptions.
(4) To separate the name publishing and management functionality into a separate software component that encapsulates a logically cohesive set of features accessible by other components.
(5) To encapsulate naming policies in a single software component. Subsequent changes to these policies will only affect this single component.
(6) To permit event related functionality to be developed and tested independently of other framework components. This feature enables parallel development of the Generic Element Management (GEM) Framework and subsequent testing.
(7) To permit new naming policies to be added to software systems without having to change components to support them.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview (0100)

Figure 1:
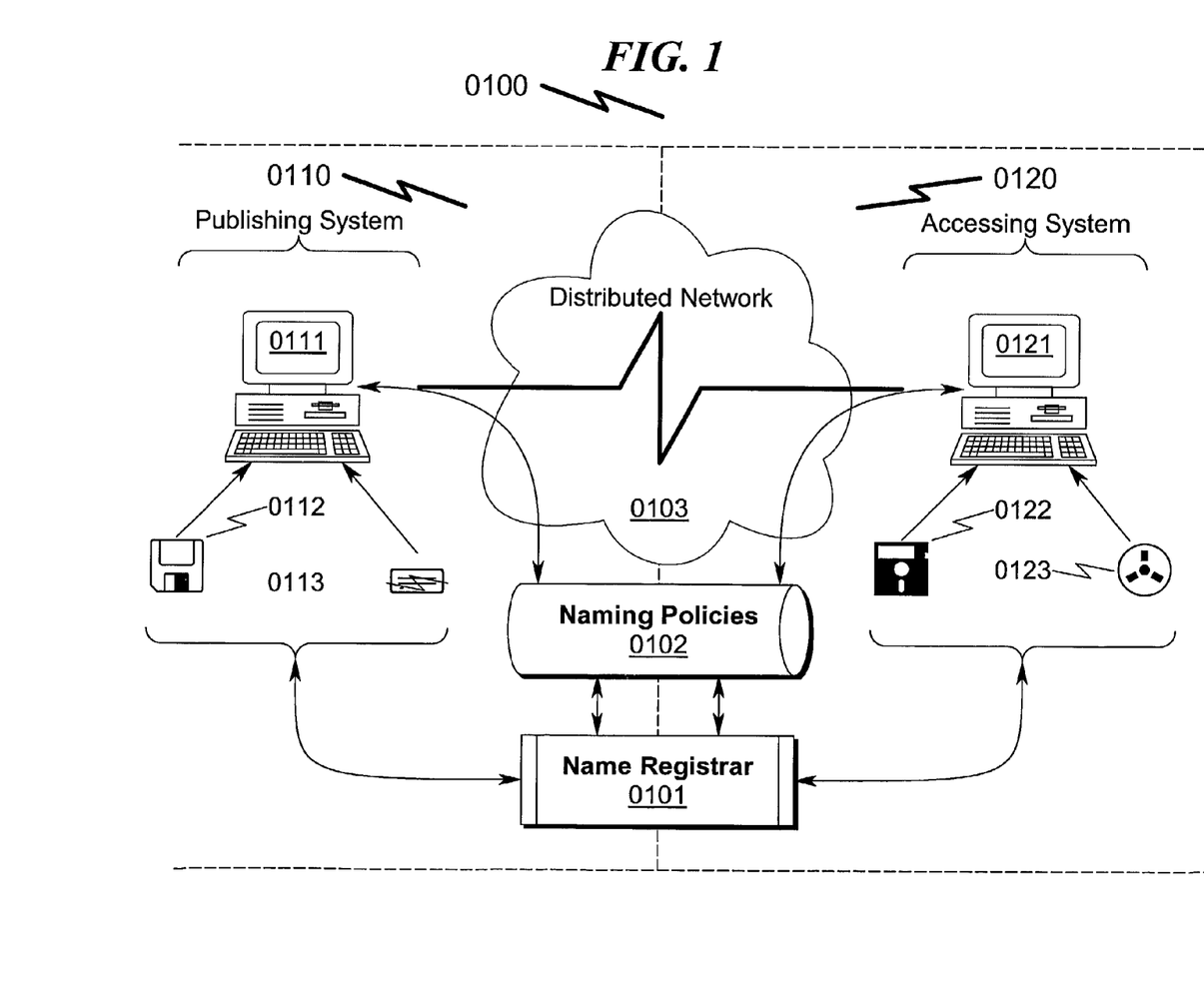
FIG. 1 illustrates a generalized system overview of the present invention.

As illustrated in FIG. 1 (0100), the present invention as embodied in a system comprises one or more distributed systems (0110, 0120) that may be connected via a distributed network (0103). These distributed systems generally comprise a Publishing System (0110) and an Accessing System (0120) that may have corresponding computer systems (0111, 0121) that operate from instructions contained in computer software embodied on a variety of media (0112, 0113, 0122, 0123).

The computer software in the disclosed invention takes the form of a distributed Name Registrar (NaR) (0101) software application that coordinates and implements Naming Policies (0102) to permit names and objects published by the Publishing System (0110) to be migrated to the Accessing System (0120) via some communication means (0103). The present invention permits the Name Registrar (0101) functionality to be centralized in one single software component to permit a greater degree of software reliability and maintainability than previously possible in the prior art.

As illustrated in FIG. 1 (0100), the distributed nature of the present invention is not specifically associated with telecommunications networks (although it has ample application in same) and may be advantageously applied to a wide variety of distributed computer software applications. Because distributed computer software applications exist for all manner of purposes, including but not limited to telecommunications network management, the scope of the exemplary application is rather broad. One could narrow the scope to just distributed computer software applications used to provide network management of telecommunications networks if necessary. However, as illustrated in FIG. 1 (0100) the broadest application could simply show the computers (0111, 0121) that host the distributed computer software (0101) (along with media (0112, 0113, 0122, 0123)), the components that make up the software and communication (0103) between them.

Exemplary Telecommunication System Application (0200)

Figure 2:
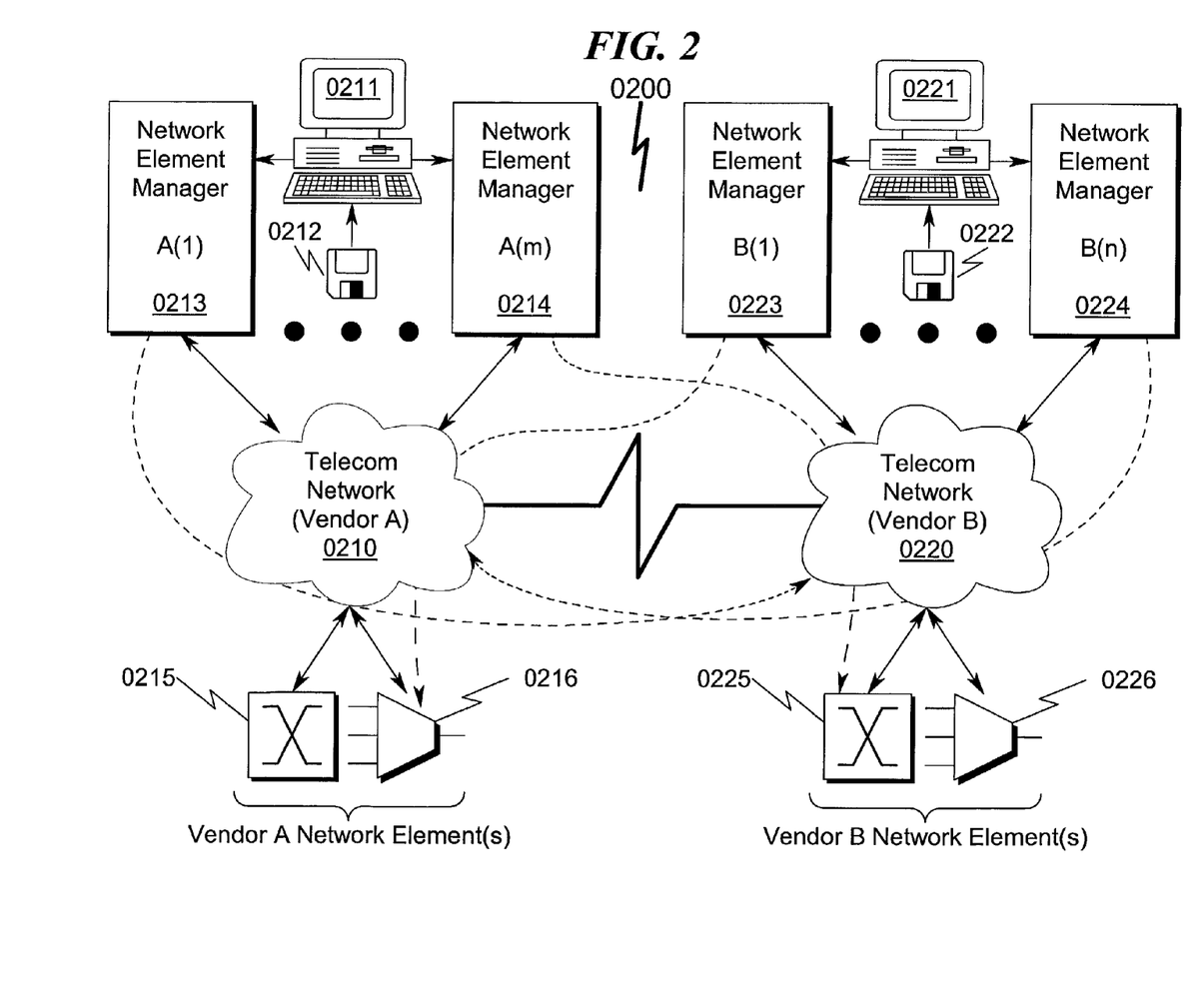
FIG. 2 illustrates an exemplary architectural overview of how the present invention may be applied to a telecommunications network environment.

As an exemplary implementation context illustrated in FIG. 2 (0200), the present invention may have application (among others) in situations where there are one or more telecommunications networks (0210, 0220) that may or may not contain equipment from different vendors. The network equipment elements (NE) used within these networks (0215, 0216, 0225, 0226) may take many forms, including but not limited to switch gear, multiplexers, and the like. These network elements (0215, 0216, 0225, 0226) are generally under control of one or more computer systems (0211, 0221) that are controlled by computer software (0212, 0222) that may be stored on a variety of storage media. This computer software generally takes the form of one or more network element managers (0213, 0214, 0223, 0224) that control and monitor the network elements (0215, 0216, 0225, 0226) that comprise constituent components of the telecommunication networks (0210, 0220). In these circumstances, the present invention may deal specifically with implementations of the event transport architecture (ETA) and its associated naming/object distribution/publication as it relates to the overall control and monitoring of the various network elements (0215, 0216, 0225, 0226) within the context of one or more telecommunications networks (0210, 0220).

Method Overview (0300)

Figure 3:
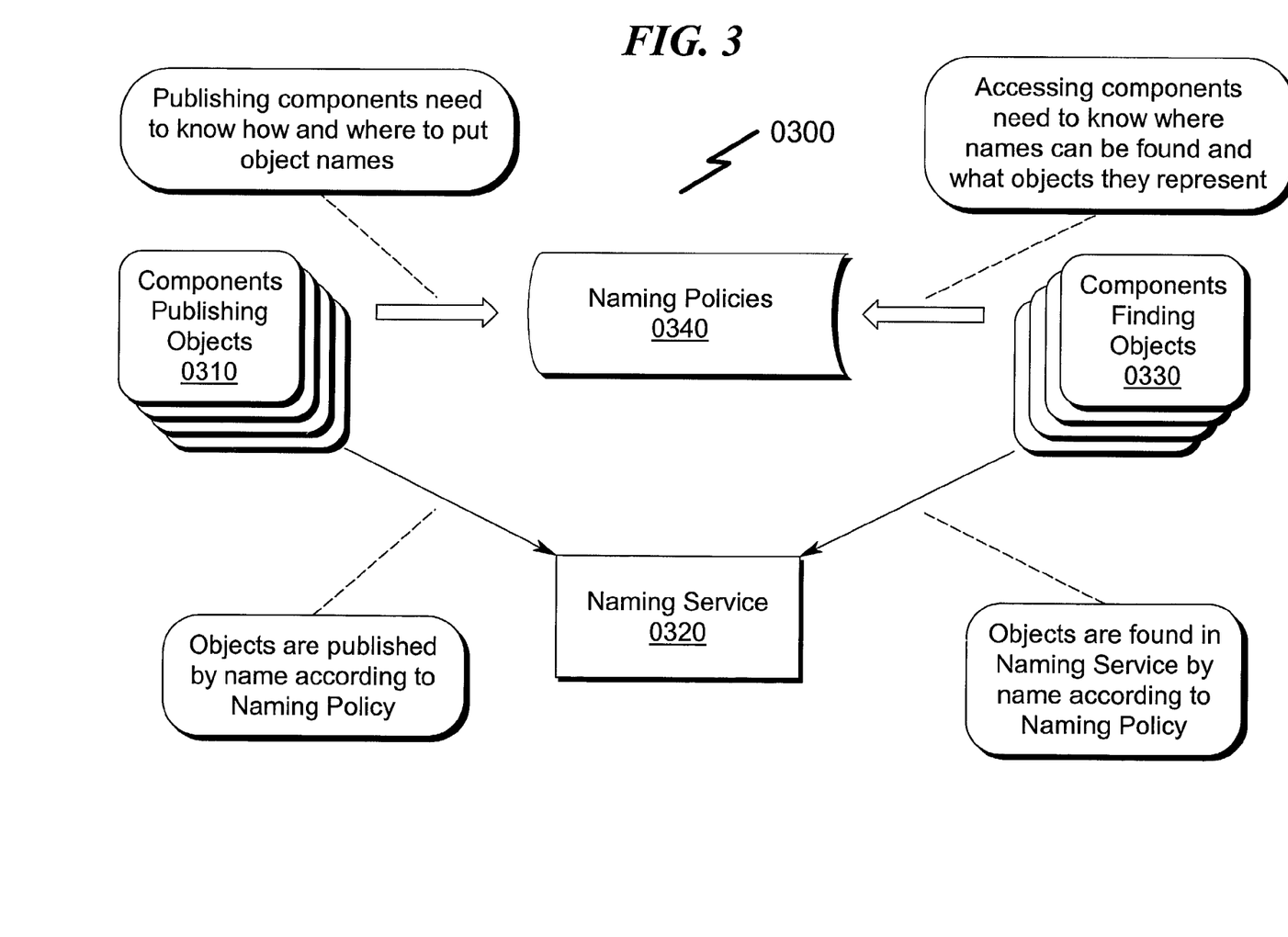
FIG. 3 illustrates a generalized method and data flow overview of the present invention.

As illustrated in FIG. 3 (0300), the present invention may have application in situations where there are one or more distributed application components (0310) that need to publish names of objects in a naming service (0320) that are later accessed by other application components (0330). Most distributed software solutions find services (in the form of objects) by looking them up by name. The publishing of these names for each object must be done in a manner that is known to all participants. The publishing rules about where the names are located, what the names mean and how they are constructed are all part of a naming policy (0340). The naming policy must be followed by all components (0310, 0330) in order for the distributed system to work. Usually this is accomplished by embedding the naming policy in each and every component that makes up the distributed application.

Figure 4:
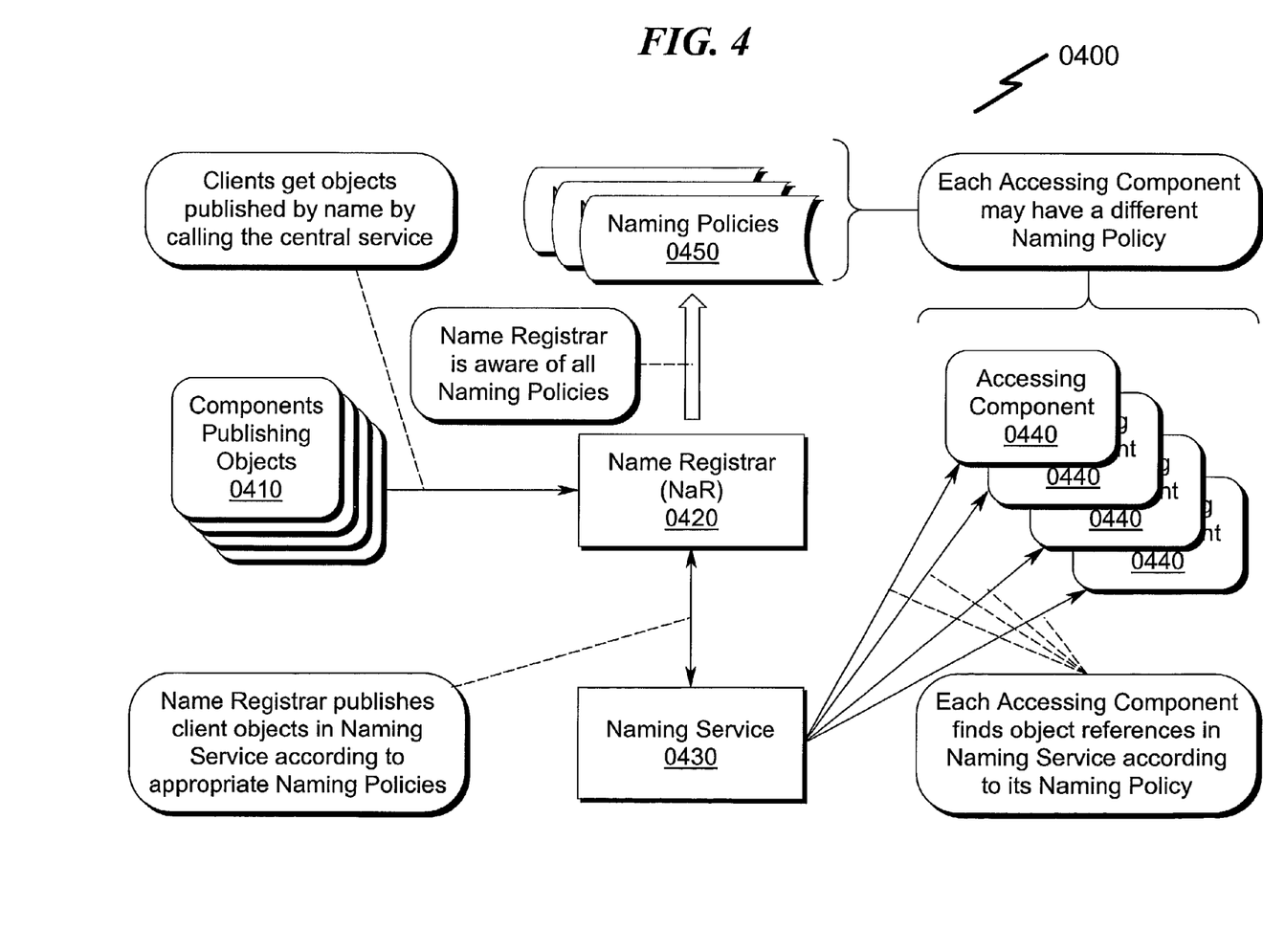
FIG. 4 illustrates the components of an exemplary method and data flow utilizing the present invention.

The present invention deals specifically with a centralized service that provides naming policy and name publishing management as implemented in a Naming Registrar (NaR) (FIG. 4, (0420)). This NaR component provides functions to read a configuration file describing one or more naming policies, build static naming structures in a naming service (0320), publish objects by name in a naming service and provides an external interface that distributed components use to have their objects published by name according to the relevant naming policies.

Exemplary Method Components (0400)

The present invention is contrasted with the prior art in that rather than embed naming policies into every component of a distributed application, a separate software process running a separate application provides a name registration service.

The name registration service is embodied in an application called the Name Registrar (NaR) (0420). The NaR provides the ability to correctly publish objects by name according to one or more naming policies (0450) for any number of components (0410). Each component (0410) accesses the NaR at runtime by way of an external interface. The component provides a list of object references along with their basic names to the NaR. The NaR uses this information in conjunction with defined naming policies to determine where and how the object references are published in the naming service (0430) so that other components (0440) can access them.

By removing the knowledge of the naming policies from the components, and placing it in a central service, the high maintenance costs for naming policy changes are significantly reduced. Instead of having to change all components, only the central service need be modified.

The NaR is both flexible and cost efficient. Changes to a naming policy, or even additional naming policies, can be added by only modifying the NaR itself. Achieving this flexibility is cost effective because only a single component, the NaR itself, is modified.

Exemplary Advantages

The present invention avoids the problems of the existing prior art solutions and their related costs. The quantifiable costs are a function of the specific naming policy features of the target distributed computing software applications. In some cases, where the requirements are minimal, these costs will be very small and the present invention is not cost efficient. With requirements for multiple, complicated naming policies for a wide variety of clients, the present invention will be very cost effective.

Furthermore, as a separate software process, the present invention can be updated in the field without impacting other components. In practice, small and large naming policy changes can be supported by stopping and restarting the present invention in its new form with no effect on other distributed components.

The only drawback of the present invention is that it requires the development of a separate software component. The development costs of a new software component with the generality to support multiple, varying naming policies is not negligible but they are relatively small. The NaR is a highly cohesive component that only has to do one thing. Additional complicated features common to other distributed components are not needed. Thus, the NaR can be developed for a small fraction of the costs of a full-scale distributed computer software application component.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a NAME REGISTRAR SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Definitions

Throughout the discussion in this document the following definitions will be utilized:

System Blocks/Procedural Steps not Limitive

The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Personal Computer not Limitive

Throughout the discussion herein there will be examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications.

Internet/Intranet not Limitive

Throughout the discussion herein the terms Internet and Intranet will be used generally to denote any network communication system or environment. Generally the term Intranet will denote communications that are local to a given system or user, and Internet will describe communications in a more distant local. One skilled in the art will recognize that these terms are arbitrary within the contexts of modern communication networks and in no way limitive of the scope of the present invention.

The present invention specifically anticipates that in some implementations the GUI development framework (and/or its runtime component) will communicate with the data used to drive the GUI over the Internet. Thus, the application driving the user interface may reside on one computer system and the data used for presentation and control may be contained somewhere else on another computer system and be accessed via any number of networking protocols.

Application Programming Interface (API) not Limitive

While the present invention may be in part implemented using standard Application Programming Interfaces (APIs) such as Software Development Kits (SDKs) and the like, there is no requirement that the present invention be implemented using these tools. Note also that the framework of the present invention may be incorporated into standard toolkits and the like which may or may not be integrated into an API framework for use in standard software development frameworks.

Operating System not Limitive

Additionally, while the present invention may be implemented to advantage using a variety of Microsoft® operating systems (including a variety of Windows™ variants), nothing should be construed to limit the scope of the invention to these particular software components. In particular, the system and method as taught herein may be widely implemented in a variety of systems, some of which may incorporate a graphical user interface. Some examples of these include HP-UX™, LINUX™, SOLARIS, and UNIX™ (and its variants), among others.

Data Structures not Limitive

The present invention may be embodied in a variety of data structures in some preferred embodiments. However, the form of such data structures as described herein is only exemplary. One skilled in the art would quickly realize that a wide variety of other data structures could be used equivalently in this application. Therefore, no data structure contained herein should be interpreted as limiting the scope of the present invention.

Communication Media not Limitive

The present invention may be embodied to affect transport of naming policy and/or name registrar information over a variety of communication media. However, the signal format used to transmit such transmissions as described herein is only exemplary. One skilled in the art would quickly realize that a wide variety of other communication media could be used equivalently in this application. Therefore, no communication media contained herein should be interpreted as limiting the scope of the present invention.

CORBA not Limitive

The present invention may be implemented using the CORBA object oriented framework in some preferred embodiments. However, the form of implementation described herein is only exemplary. One skilled in the art would quickly realize that a wide variety of other distributed object oriented frameworks could be used equivalently in this application. Therefore, no framework contained herein should be interpreted as limiting the scope of the present invention.

A detailed technical description of the Naming Service used within the context of the various exemplary embodiments of the present invention can be obtained by referring to the CORBA Standard Services documentation ("The Common Object Request Broker: Architecture and Specification" at ftp://ftp.omg.org/pub/docs/formal/98-12-01.pdf as well as the 1998 Object Management Group (OMG) CORBAservices: Common Object Services Specification, Revised Edition, OMG TC Document 98-12-09, Object Management Group (ftp://ftp.omg.org/pub/docs/formal/98-12-09.pdf)). These naming services are only exemplary of many that are possible for use with the teachings of the present invention.

Exemplary Application Overview

Relationships to Invention Overview

The exemplary application is used in a distributed computing software application for network management functions for telecommunications networks. In this application, there are several components that need to have objects published in the naming service, but the primary ones are Element Management Layer (EML) Servers. There are two primary types of accessing components, with multiple instances of each, that need to find objects by name. One type of component uses a naming policy defined by an ECOM specification. Another type of component uses a naming policy defined by a 1353GEM specification. All components in this example use the CORBA standard Naming Service as a central location for storing and accessing names.

Separate Application

The present invention as embodied in the Naming Registrar (NaR) is implemented as a separate, stand-alone application. This application is usually run on the same delivery platform (PC, etc.) used by the other components that make up the distributed network management software application. The exemplary NaR uses CORBA interfaces to provide access to its services. It uses an implementation of a CORBA Naming Service for storage of object references by name. The NaR is started as part of the network management software infrastructure and runs indefinitely. It can be stopped by external command.

Operational Behavior (0500)

Figure 5:
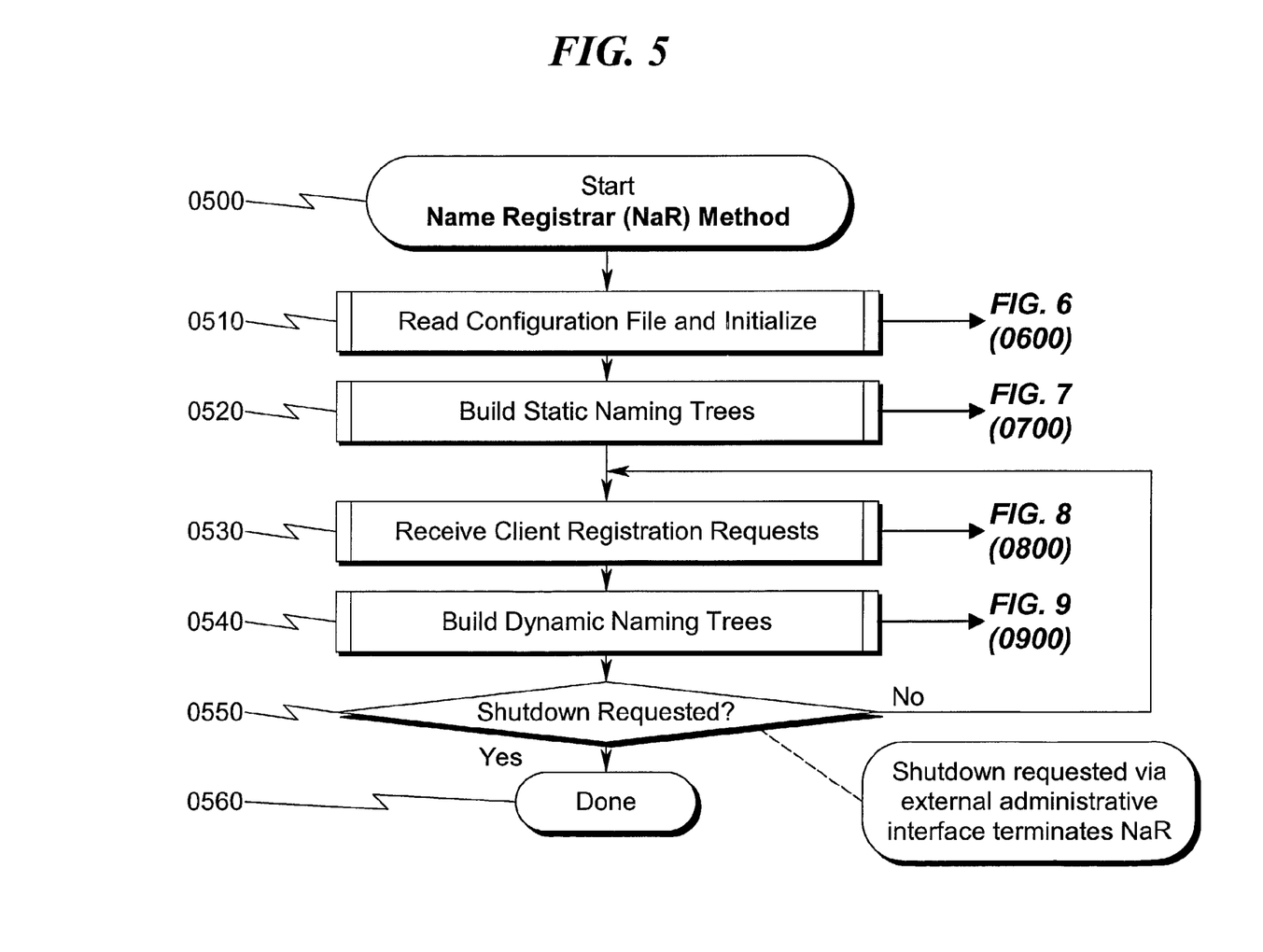
FIG. 5 illustrates an exemplary process flowchart for the present invention.

Upon startup the NaR reads a configuration file that describes the necessary naming policies (0510). Then, the NaR obtains a reference to the Naming Service, a place where all named interfaces are stored. The NaR creates the necessary static entries in the Naming Service according to the desired policies specified in the configuration file (0520).

When other client components startup and create interface objects that represent their services, they contact the NaR (0530). These clients of the NaR provide necessary information to the NaR either in the initial registration call or by responding to NaR queries.

The NaR uses this information (and its configured naming policies) to place the client objects into the Naming Service (0540). The NaR uses the naming policy information to determine where and with what actual names, the objects are placed.

Exemplary Application Behavior

This section describes, using various diagrams to include flowcharts, how the exemplary application behaves to achieve its functionality.

Naming Policy Example (1000)

Figure 10:
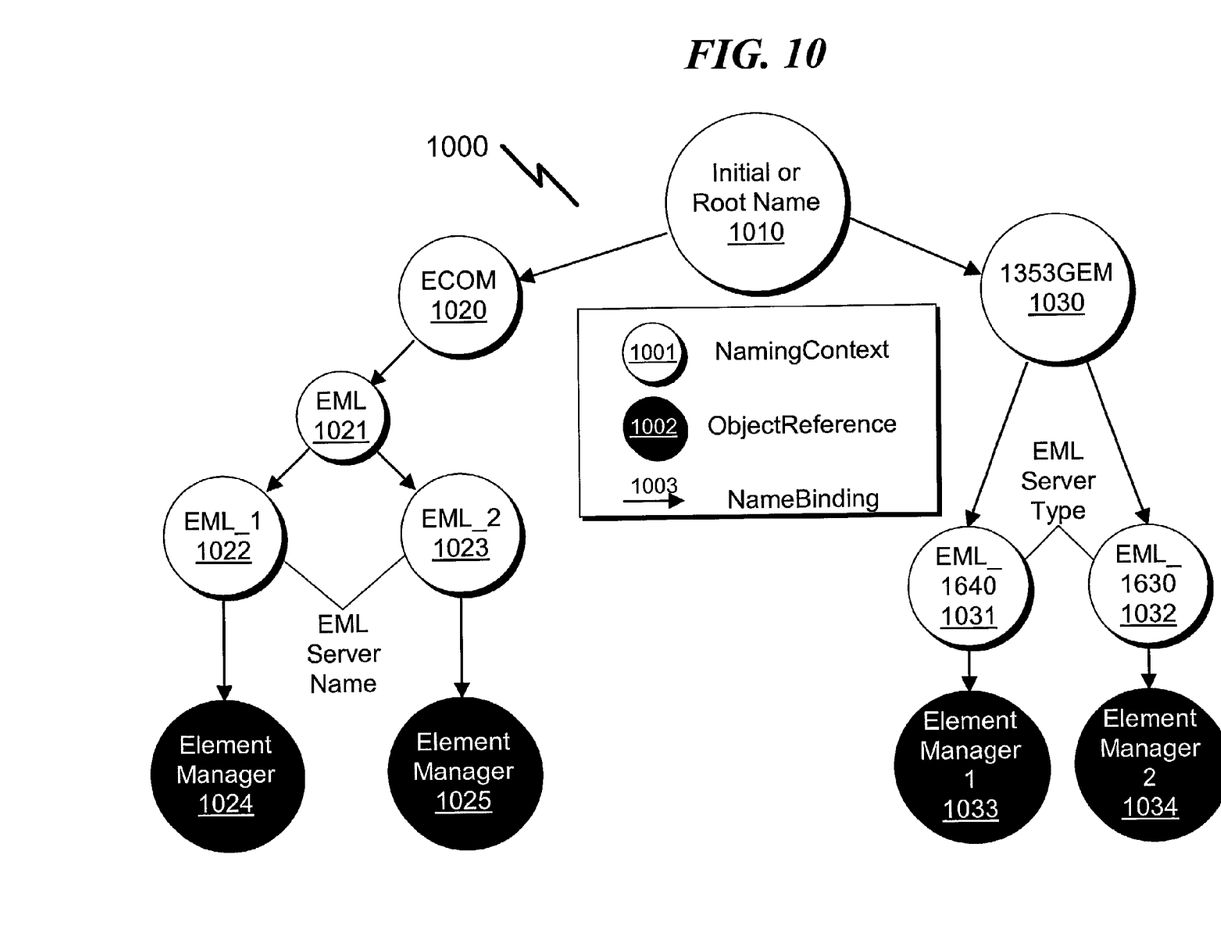
FIG. 10 illustrates the naming policies (shown as an exemplary naming tree) that an exemplary embodiment of the present invention may support.

FIG. 10 (1000) illustrates a naming tree that is an example of what is required by two naming policies. A naming tree is a hierarchical model of named nodes where object references are the 'leaves' of the tree. One skilled in the art will recognize that this is a typical tree computer data structure. One will also recognize how this tree can be constructed in a CORBA Naming Service using its standard interface.

In this naming tree, each major node (1001) represents a Naming Context in the Naming Service. Naming Contexts represent major braches of the tree. Each object reference node (1002) is bound to a Naming Context by a specific name. The path to an individual object reference node is the set of names of its containing Naming Contexts represented by the name bindings (1003) between the nodes. In FIG. 10, the name path for object reference node (1024) is "ECOM/EML/EML__1/ElementManager". Accessing components that know this naming policy can find the object references by using the name path.

In FIG. 10, there are two naming policies, one for the ECOM specification and one for the 1353GEM specification. Note that the two policies can co-exist in the same Naming Service without any conflicts.

ECOM Naming Policy (1020)

The naming rules for ECOM (1020) are:
a. There are two static Naming Contexts, one with the naming binding of "ECOM" which is contained by the root context, and one with the name binding of "EML" which is contained by ECOM.
b. For every EML Server that registers, a new Naming Context is created that has the same name as the EML Server itself.
c. The ElementManager object reference, which the EML Server has as one of its services, is bound to the Naming Context with the name of the EML Server. The name binding used is "Element Manager".

GEM Naming Policy (1030)

The naming rules for 1353GEM (1030) are:
a. There is a single static Naming Context with the name binding "1353GEM" which is contained by the root context.
b. For every EML Server that registers, a Naming Context is created which represents which kind of Network Elements that the EML Server manages. The name binding of the context is the text "EML_" followed by the name of the managed network element type (for (1031), this is "1640").
c. For every EML Server that registers, the ElementManager object reference is bound to the appropriate NE type context. The name binding for the object reference is the text "ElementManager_" followed by the numeric identifier for that EML Server.

Functional Overview (0500)

FIG. 5 (0500) illustrates the logical flow of the entire application. The exemplary application is started by computer specific means; one skilled in the art is familiar with many ways to accomplish this. It then reads its configuration and initializes its internal modules (0510). The NaR builds whatever static portions of the naming trees that are specified in the naming policies (0520). At this point, the NaR is ready to receive registration requests from its clients (0530). When a client registers, the NaR builds the dynamic portions of the naming tree that are based upon client supplied information and the required naming policies (0540). The NaR can then handle additional client registrations. By means of an optional external shutdown operation, the NaR will exit. Each node in FIG. 5 is explained in more detail in the subsequent figures.

Read Configuration and Initialize (0600)

Figure 6:
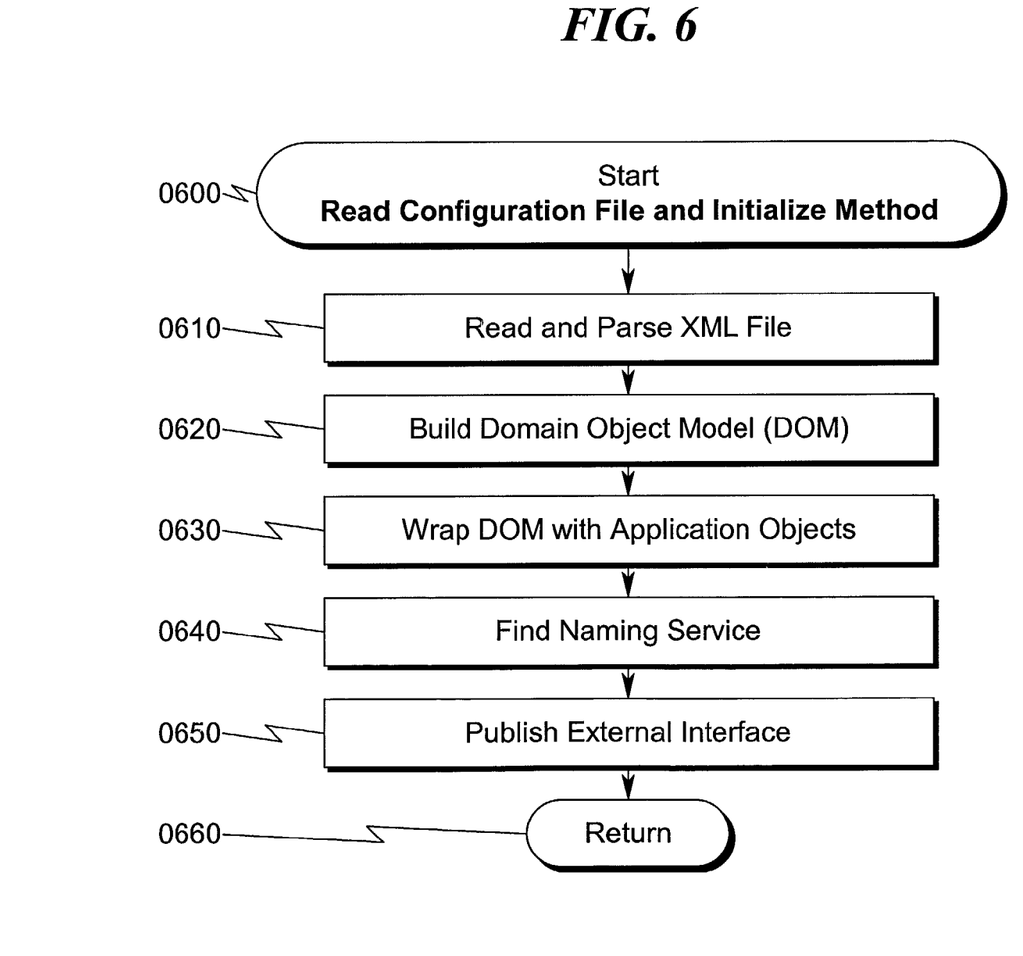
FIG. 6 illustrates how an exemplary invention embodiment may read its configuration and initialize its internal capabilities.

FIG. 6 (0600) describes the logical flow of reading the configuration and initializing the exemplary application for use. The exemplary application reads and parses an external Extensive Markup Language (XML) or other support file that describes the naming policies that must be supported (0610). One skilled in the art will recognize the utility of using an XML description of structured data and how it may be used to describe naming policy rules. A Domain Object Model (DOM) representation of the data in the XML file is built (0620). This DOM describes the requirements for static and dynamic naming context nodes that are necessary for each naming policy. For convenience and ease of development, the DOM objects are wrapped with application specific objects (0630). One skilled in the art will recognize the utility of such adaptation and the means to do it. Then, the exemplary application finds the root Naming Context in the external Naming Service (0640). Using this root context, the exemplary application will publish its own external interface object so that clients can find the NaR to register on it (0650).

Build Static Naming Tree (0700)

Figure 7:
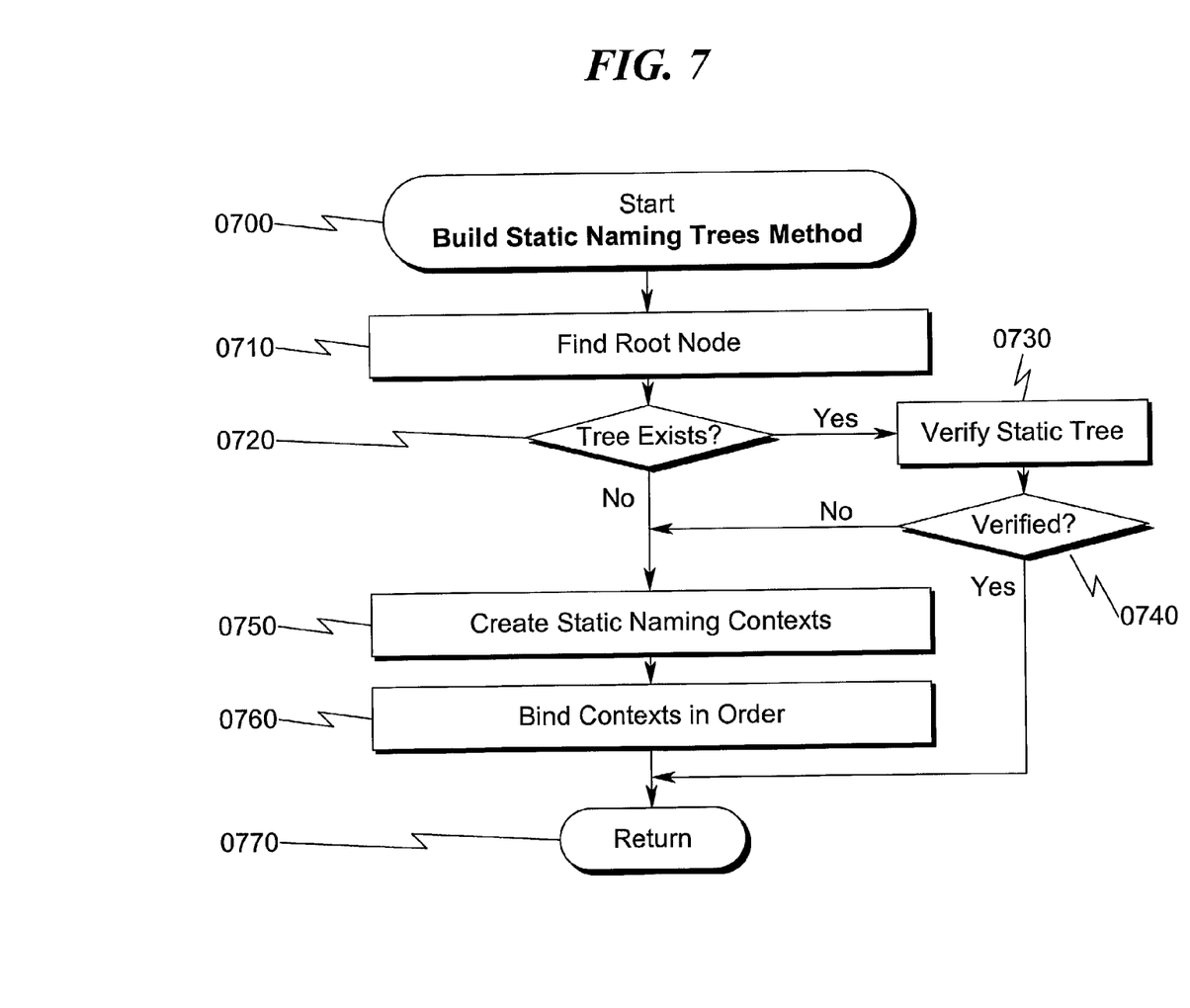
FIG. 7 illustrates how an exemplary invention embodiment may build the static portion of a naming tree based upon desired naming policies.

The exemplary application uses the configuration data from (0610) to determine what static naming context nodes must be created to support the required naming policies. To create these static contexts, the exemplary application finds the root naming context (0710), which is shown as (1010). The NaR first checks to see if there is already a naming tree present (0720) or not. A naming tree may already be present if the NaR was started, then stopped and restarted. If a naming tree exists, the NaR verifies that it contains the necessary static naming contexts (0730). If the tree is verified (0740) the NaR ends this activity. If not, it builds the static contexts in the usual fashion.

Figure 11:
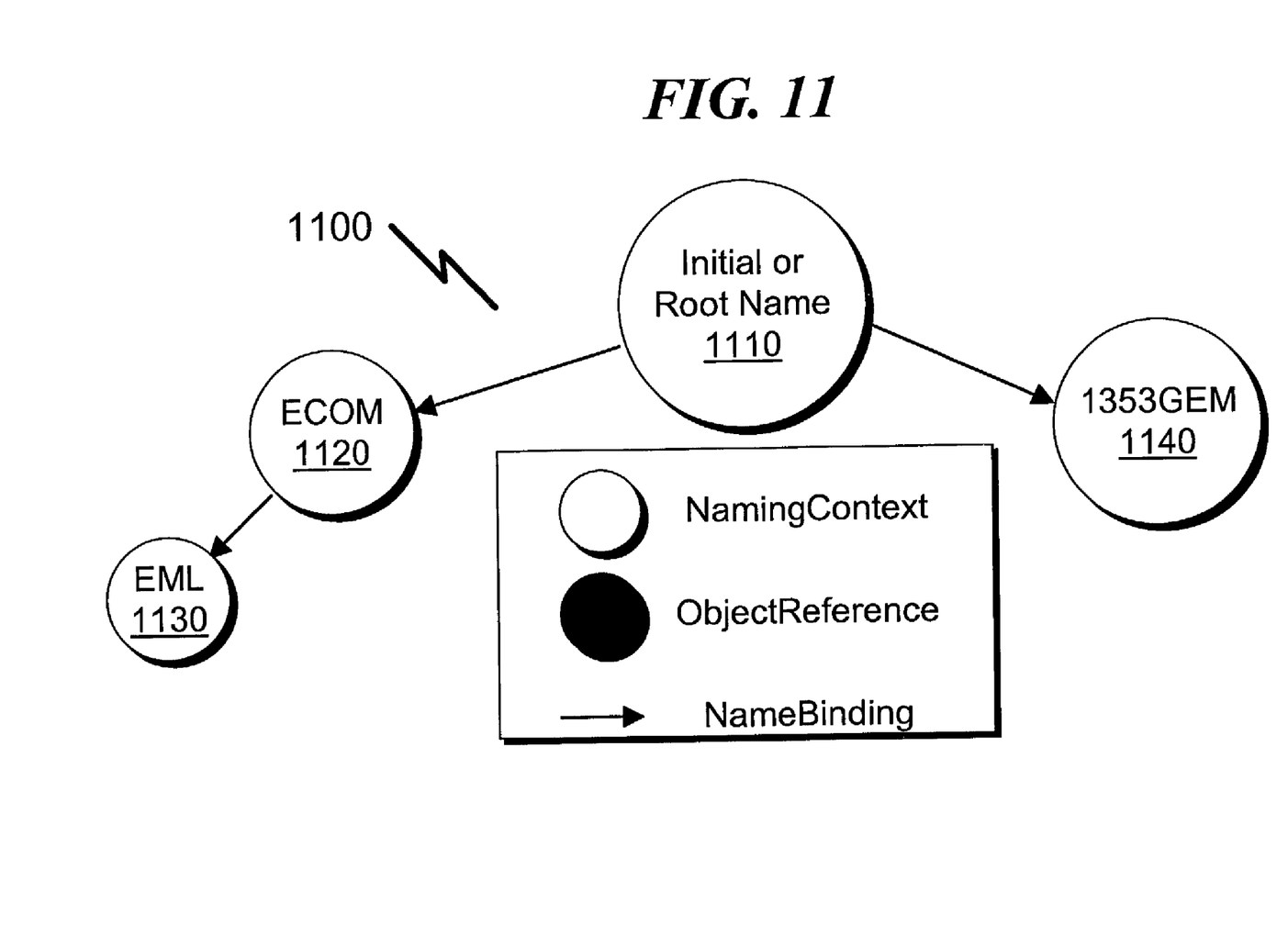
FIG. 11 illustrates the static portion of the naming tree supported by an exemplary embodiment of the present invention.

The NaR first creates each individual static Naming Context (0750) using the standard Naming Service interface. It then binds these contexts in the required order of name paths using the names specified in the naming policies (0760). FIG. 11 (1100) illustrates the static naming contexts of the naming tree example from FIG. 10. In this tree, the NaR finds the root context (1110) and then creates (for example) the ECOM, 1353GEM, and EML contexts (1120, 1130, 1140). It binds (1120) and (1140) to the root context and then binds the EML context (1130) to the ECOM one (1140). In this fashion the initial and static portions of the naming tree are constructed and are available for the later dynamic portions to be inserted.
Receive Client Registration (0800)

Figure 8:
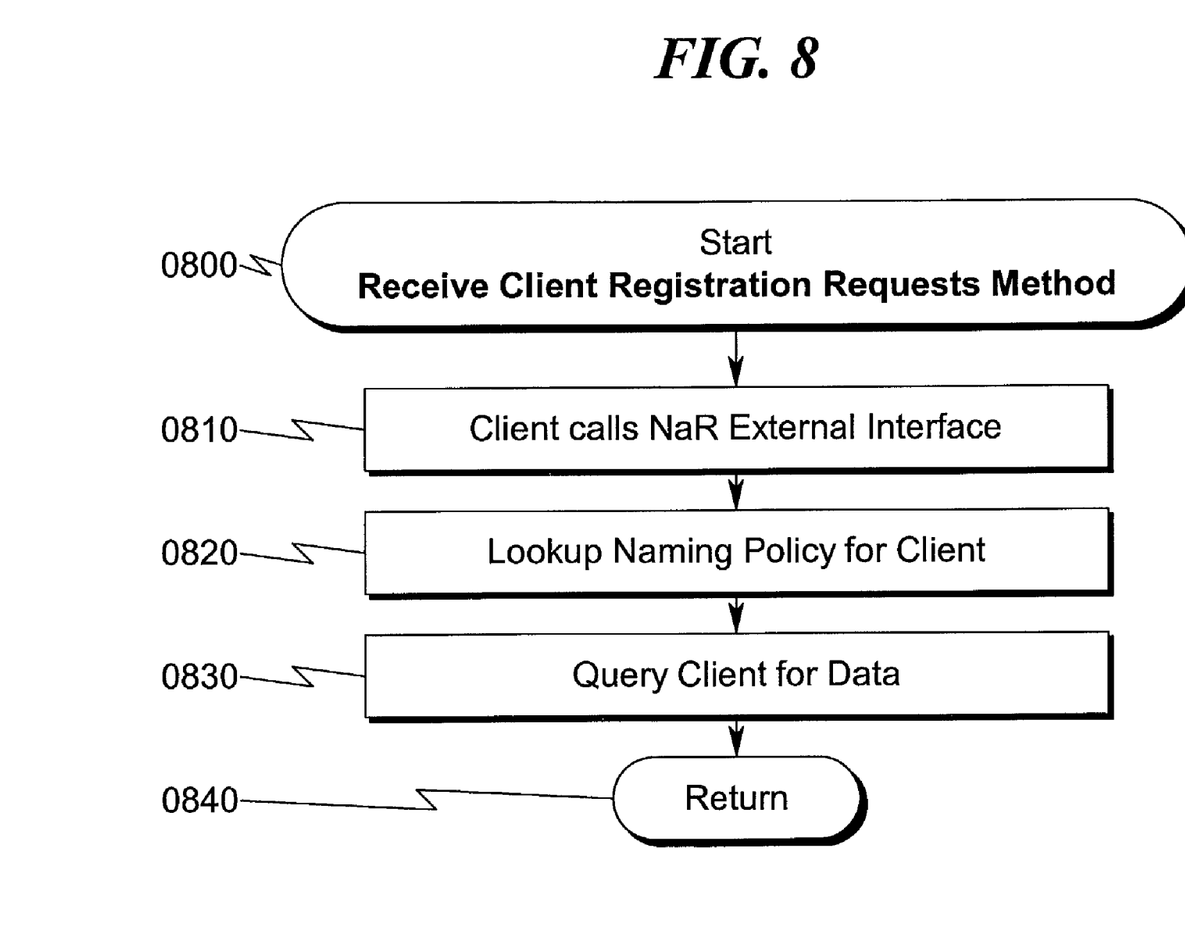
FIG. 8 illustrates how an exemplary invention embodiment may be called by external components to get their objects published.

FIG. 8 (0800) describes how the NaR handles client registrations. A client registers with the NaR by calling an operation on the external interface of the NaR (0810). In response to this call, the NaR looks up the naming policy that is to be used for the registering client (0820). It does this using the information available from step (0630). Based upon the naming policy, the NaR may make queries on the client. This is done so that the NaR can find out all the data it needs to create the dynamic naming contexts in the naming tree (0830). Alternatively, the client may supply this information in the initial call. The NaR needs to have object reference values for target objects and naming data that is only available from the client for the next step.
Build Dynamic Naming Trees (0900)

Figure 9:
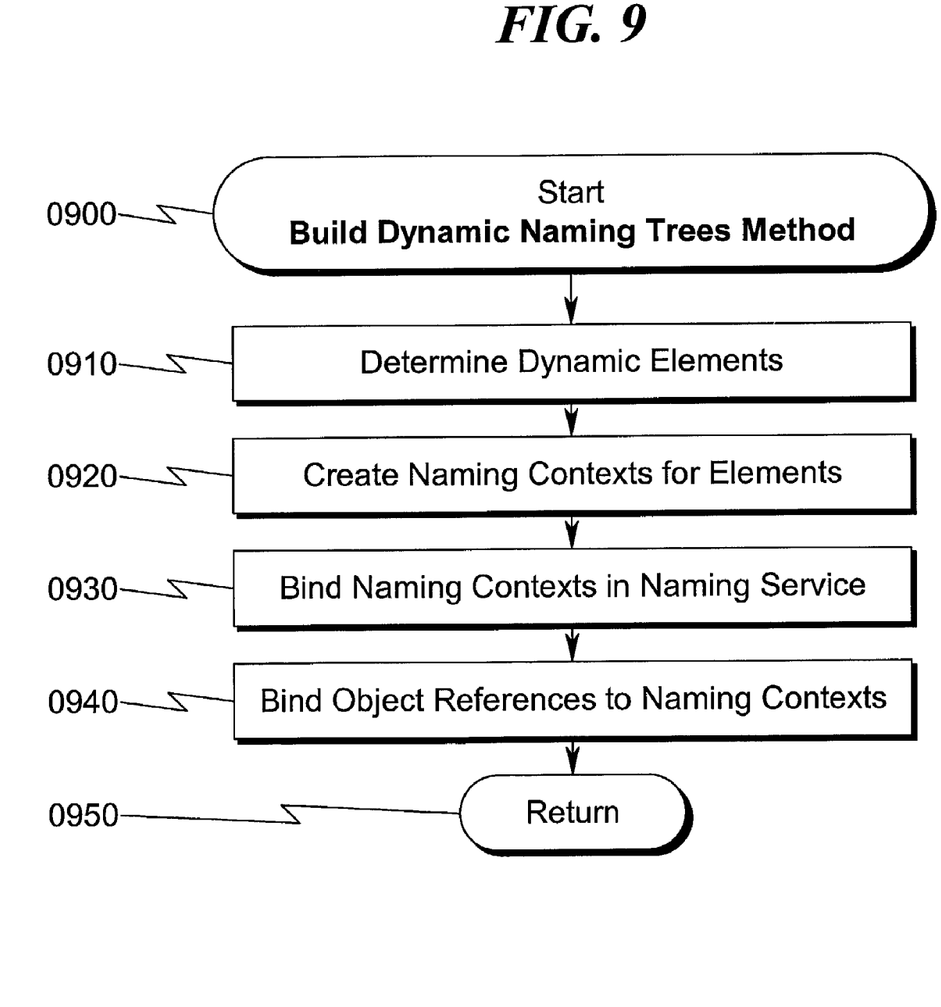
FIG. 9 illustrates how an exemplary invention embodiment may build the dynamic, or runtime, portion of a naming tree based upon desired naming policies and client-supplied data.

FIG. 9 (0900) describes how the NaR creates the dynamic naming contexts in the naming tree for all required naming policies. Using the information from step (0830) the NaR determines which dynamic elements: specific naming contexts, their names and locations, are required (0910). It creates the Naming contexts for each dynamic element (0920). It then creates the appropriate names for these contexts using naming policy rules and registered client data and binds the contexts in the naming service with these names (0930). Finally, the NaR constructs the required names for the client supplied object references and binds the references by those names (0940) to the naming contexts from step (0930).

Figure 12:
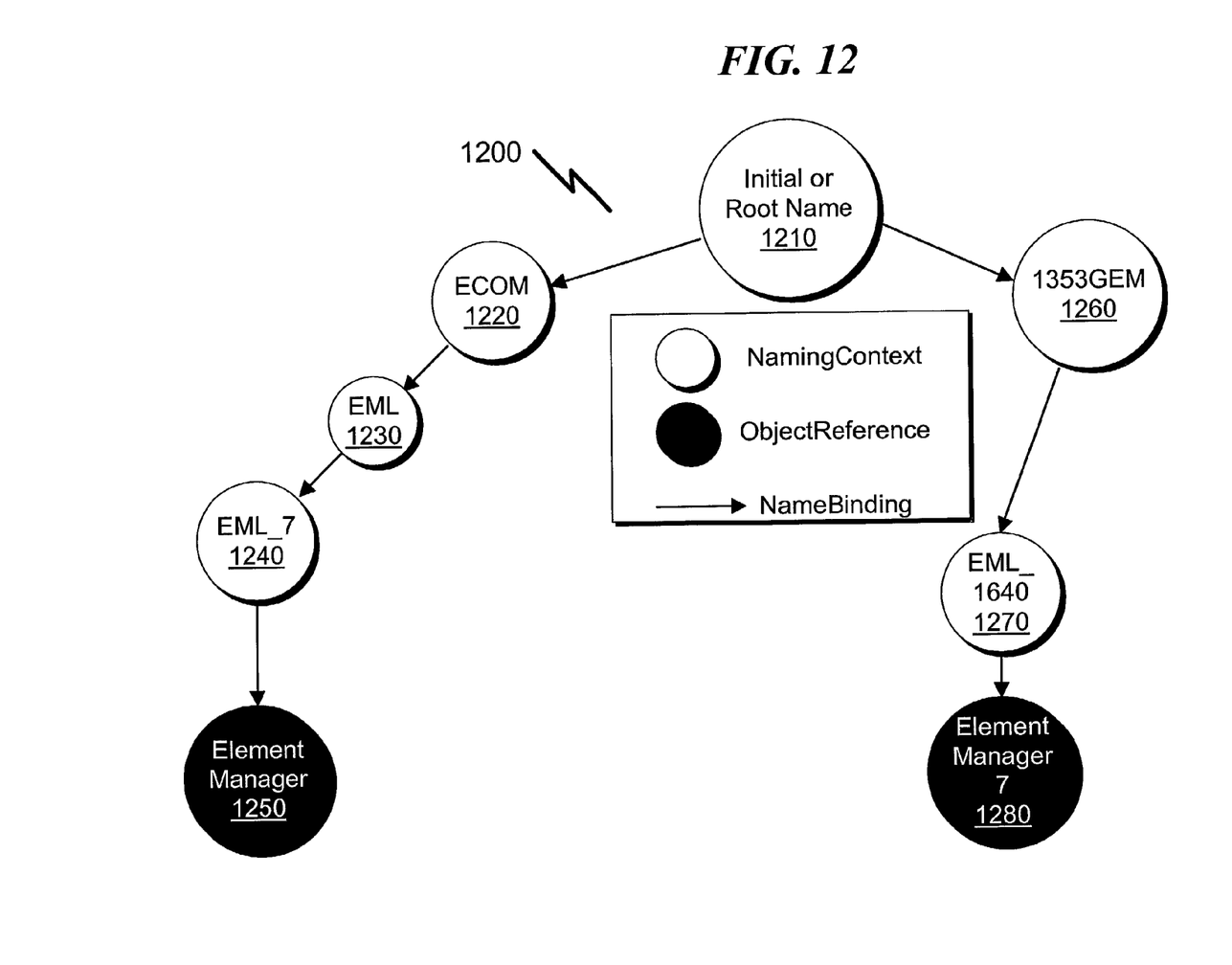
FIG. 12 illustrates the dynamic portion of the naming tree supported by an exemplary embodiment of the present invention for a single client registration request.

FIG. 12 (1200) illustrates how this process would work using the exemplary naming tree from FIG. 10 (1000). The static portions of this tree were created according to the static naming trees method (FIG. 7 (0700)) and are shown in FIG. 11 (1100). In this example, an EML Server which manages 1640-type Network Elements and whose numeric ID is "7" is registering with the NaR.

The NaR finds the two naming policies that must be supported for this client as noted in step (0910). The NaR creates the Naming Contexts in the tree (1240, 1270) according to (0920). The NaR must then compute the names of these contexts based upon client supplied data and the naming policies.

The client tells the NaR in its registration call that it manages 1640-type NEs and that its numeric ID is "7". Using this data, the NaR constructs the name "EML_7" for (1240) and "EML_1640" for (1270). Using these names, the NaR binds the contexts to the static parts of the tree (0930).

In order to bind the object references to the tree (0940), the NaR needs these references and must compute name bindings for them. The registering client also supplies the object reference for the ElementManager object. The NaR constructs the names "ElementManager" and "ElementManager_7" from the data it has and the naming policy rules. Finally, it binds the object references using these names into the naming tree at (1250) and (1280).

Preferred System Context of the Present Invention

Generalized Distributed Software Environment (0100)

As mentioned previously, the present invention may have wide application in distributed computer system networks in which one or more publishing systems (0110) communicate with one or more accessing systems (0120) to transfer names/objects and/or manipulate and control naming policies (0102) under control of a centralized name registrar (0101) service. While one skilled in the art will realize that a wide variety of computer networks (0103) are applicable to this environment, there are also situations where the publishing (0110) and accessing (0120) systems may reside on the same computer system.

Exemplary Telecommunications Context (0200)

While the present invention may be best applied to situations in which telecommunications networks are to be managed and maintained either locally or remotely using graphical user interface (GUI) based operator consoles, the present invention also has wide applicability in situations in which any type of hardware and/or software component in a computer network is to be managed in a uniform way with minimal software design complexity and maintenance costs.

The functional elements of the present invention are widely applicable to situations involving multiple types of remote equipment sourced from a variety of hardware and software manufacturers. Since the present invention breaks the compile-time link between network element management and the tool used to perform the management function, this permits a wide variety of applications in situations where networks must be grown dynamically by adding hardware and software, but which must remain up and functional during this upgrade process.

CONCLUSION

A Name Registrar (NaR) system and method incorporating a separate software component that permits manipulation, control, and distribution of names/objects under direction of a distributed naming policy has been disclosed. The present invention teaches creation of a separate software component to handle name registration running within a separate software process. This separate software process has a remote interface utilized by a software application to send information related to names/objects in their most basic form to the Name Registrar (NaR). Subsequently, the NaR performs all other functions that are necessary to publish the supplied name/object in the proper form and type required by the accessing system consumers.

Although a preferred embodiment of the present invention has been illustrated in the accompanying Drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A distributed software application stored on one or more non-transitory computer readable mediums in one or more computer systems having a plurality of components including a name registration service, comprising:

one or more publishing components executing on the one or more computing systems with object references for publishing by name to other components in the distributed software application;

a plurality of accessing components executing on the one or more computing systems that need access to published object references, wherein the plurality of accessing components use a plurality of different naming policies to access the published object references; and a separate name registrar component executing on the one or more computing systems for publishing object references as requested by said one or more publishing components in a naming service according to the plurality of different naming policies, wherein a first of the plurality of accessing components accesses at least one of the object references according to a first one of the plurality of different naming policies and a second of the plurality of accessing components accesses the at least one of the object references according to a second one of the plurality of different naming policies.

2. The distributed software application according to claim 1, wherein the first of the plurality of accessing components locates published object references in the naming service according to the first one of the plurality of different naming policies associated with the first of the plurality of accessing components and wherein the second of the plurality of accessing components locates published object references in the naming service according to the second one of the plurality of different naming policies associated with the second of the plurality of accessing components.

3. The distributed software application according to claim 2, wherein the plurality of different naming policies includes publishing rules about where names of services are located, what names of services mean and how names of services are constructed.

4. The distributed software application according to claim 3, wherein the name registrar component includes a configuration file describing the plurality of different naming policies.

5. The distributed software application according to claim 4, wherein the name registrar component includes means for building static naming structures for the plurality of different naming policies.

6. The distributed software application according to claim 5, wherein the name registrar component includes an external interface for receiving requests from publishing components to publish object references according to the plurality of different naming policies.

7. The distributed software application according to claim 6, wherein the name registrar component includes means for determining from the requests and naming policies where and how to publish object references in accordance with the plurality of different naming policies such that the plurality of accessing components can access the object references.

8. A name registrar method in a distributed application, comprising:
reading a configuration file in a computing system that includes a plurality of naming policies;
receiving requests from a client component for publication of client objects in a centralized naming service;
placing the requested client objects from the client component in the centralized naming service according to two or more of the plurality of naming policies;
receiving a first request to access the client objects in the centralized naming service by a first accessing component according to one of the two or more naming policies associated with the first accessing component; and
receiving a second request to access the client objects in the centralized naming service by a second accessing component according to a different one of the two or more naming policies associated with the second accessing component.

9. The name registrar method of claim 8, further comprising:
after reading the configuration file, constructing a static naming tree of initial and static portions of naming contexts for each naming policy.

10. The name registrar method of claim 9, further comprising:
after receiving a request from a client component for publication of a client object, creating dynamic naming contexts in the static naming tree for each naming policy that must be supported for the client object in order to create appropriate names for the client object.

11. The name registrar method of claim 10, further comprising:
inspecting external shutdown requests to determine whether shutdown is requested.

12. The name registrar method of claim 11 wherein one or more steps of the method is implemented within an application programming interface (API).

13. A centralized name registration service stored on one or more non-transitory computer readable mediums in one or more computer systems for providing naming policy and name publishing management to one or more distributed publishing components for publication of object references to other components, comprising:
a centralized naming registrar component in the one or more computer systems for providing an interface for the distributed publishing components to publish the object references by name according to relevant naming policies, wherein the naming registrar reads a configuration file that includes a plurality of naming policies, determines where and how the object reference are published in a naming service and publishes the object references by name in the naming service according to relevant naming policies, wherein a first object reference is accessible by a first accessing component according to a first one of the plurality of naming policies associated with the first accessing component and a second object reference is accessible by a second accessing component according to a second different one of the plurality of naming policies associated with the second accessing component.

* * * * *